(12) United States Patent
Alexiou et al.

(10) Patent No.: US 7,242,724 B2
(45) Date of Patent: Jul. 10, 2007

(54) METHOD AND APPARATUS FOR TRANSMITTING SIGNALS IN A MULTI-ANTENNA MOBILE COMMUNICATIONS SYSTEM THAT COMPENSATES FOR CHANNEL VARIATIONS

(75) Inventors: Angeliki Alexiou, Swindon (GB); Mohammed Qaddi, Swindon (GB)

(73) Assignee: Lucent Technologies Inc., Murray Hill, NJ (US)

(*) Notice: Subject to any disclaimer, the term of this patent is extended or adjusted under 35 U.S.C. 154(b) by 774 days.

(21) Appl. No.: 10/620,987

(22) Filed: Jul. 16, 2003

(65) Prior Publication Data

US 2005/0020237 A1    Jan. 27, 2005

(51) Int. Cl.
*H04B 7/02* (2006.01)
(52) U.S. Cl. ..................... 375/267; 375/299
(58) Field of Classification Search ........ 375/259–260, 375/267, 295, 358, 299, 347; 370/329–330, 370/332, 350; 455/500–506, 63.1, 65, 101, 455/562.1, 115.1
See application file for complete search history.

(56) References Cited

U.S. PATENT DOCUMENTS

| | | | |
|---|---|---|---|
| 6,185,258 B1 | 2/2001 | Alamouti et al. | 375/260 |
| 6,980,600 B1* | 12/2005 | Ratnarajah | 375/260 |
| 7,072,413 B2* | 7/2006 | Walton et al. | 375/267 |
| 7,120,199 B2* | 10/2006 | Thielecke et al. | 375/267 |

OTHER PUBLICATIONS

Siavash M. Alamouti, "A Simple Transmit Diversity Technique for Wireless Communications", *IEEE Journal on Select Areas in Communications*, vol. 16, No. 8, (Oct. 1998), pp. 1451-1458.

George Jongren, et al, "Combining Transmit Antenna Weights and Orthogonal Space-Time Block Codes by utilizing Side Information", *IEEE 1999*, pp. 1562-1566.

George Jongren, et al, "Combining Transmit Beamforming and Orthogonal Space-Time Block Codes by Utilizing Side Information", *IEEE 2000*, pp. 153-157.

George Jongren, et al, "Combining Beamforming and Orthogonal Space-Time Block Coding", *IEEE Transactions on Information Theory*, vol. 48, No. 3, (Mar. 2002), pp. 611-627.

Aradhana Narula, et al, "Efficient Use of Side Information in Multiple-Antenna Data Transmission Over Fading Channels", *IEEE Journal on Selected Areas in Communications*, vol. 16, No. 8, (Oct. 1998), pp. 1423-1436.

Aradhana Narula, et al, "Performance Limits of Coded Diversity Methods for Transmitter Antenna Arrays", *IEEE Transactions on Information Theory*, vol. 45, No. 7, (Nov. 1999), pp. 2418-2433.

(Continued)

*Primary Examiner*—Khanh Tran

(57) ABSTRACT

A method is provided for transmitting signals from a transmitter comprising two or more antennas in a mobile telecommunications network. The method involves determining channel state information, estimating the reliability of that channel state information, and space time block encoding at least one data sequence. Before transmitting the data sequence, a linear transformation is applied to the data sequence so as to at least partially compensate for channel variations. The linear transformation is dependent upon the channel state information and upon the estimated reliability of the channel state information.

23 Claims, 2 Drawing Sheets

OTHER PUBLICATIONS

Vahid Tarokh, et al, "Space-Time Block Codes from Orthogonal Designs", *IEEE Transactions on Information Theory*, vol. 45, No. 5, (Jul. 1999), pp. 1456-1467.

Eugene Visotsky, et al, "Space-Time Transmit Precoding With Imperfect Feedback", *IEEE Transactions on Information Theory*, vol. 47, No. 6, (Sep. 2001), pp. 2632-2639.

Shengli Zhou, et al, "Optimal Transmitter Eigen-Beamforming and Space-Time Block Coding Based on Channel Correlations", *IEEE 2002*, pp. 553-557.

Shengli Zhou, et al, "Optimal Transmitter Eigen-Beamforming and Space-Time Block Coding Based on Channel Mean Feedback", *IEEE Transactions on Signal Processing*, vol. 50, No. 10, (Oct. 2002), pp. 2599-2613.

"3rd Generation Partnership Project; Technical Specification Group Radio Access Network; Physical Channels and Mapping of Transport Channels Onto Physical Channels" (FDD) (Release 5), *3GPP TS 25.211* V5.4.0 (Jun. 2003), pp. 1-51.

M. K. Simon, et. al, "Digital Communication Over Fading Channels: A Unified Approach to Performance Analysis", *John Wiley & Sons*, 2000, pp. 212-219.

Shengli Zhou, et al, "Optimal Transmitter Eigen-Beamforming and Space-Time Block Coding Based on Channel Mean Feedback," *IEEE Transactions on Signal Processing, IEEE, Inc.* New York, vol. 50, No. 10, (Oct. 2002), pp. 2599-2613.

Alexander Seeger, et al, "Performance of Downlink Eigenbeamformer with Realistic Feedback Transmission," *IEEE Vehicular Technology Conference*, NY, vol. 1 of 4, Conf. 54, (Oct. 7, 2001), pp. 1269-1273.

European Search Report.

* cited by examiner

METHOD AND APPARATUS FOR TRANSMITTING SIGNALS IN A MULTI-ANTENNA MOBILE COMMUNICATIONS SYSTEM THAT COMPENSATES FOR CHANNEL VARIATIONS

FIELD OF THE INVENTION

The present invention relates to wireless communications, and more particularly, to transmitting signals from a transmitter comprising two or more antennas in a mobile telecommunications network.

DESCRIPTION OF THE RELATED ART

In mobile telecommunications systems, even though feeding back information about a channel to a transmitter would produce benefits by enabling the transmitter to compensate for channel variations, reliable feedback about a channel is difficult to obtain due to the rapid variations over time that a channel experiences.

When a mobile user terminal moves at high speed, the combined effects of channel estimation, power control, quantisation and feedback delay, prevent feedback schemes which are "closed loop", i.e. involving feedback from the receiver to the transmitter, from accurately tracking rapid channel fluctuations. As a result, due to the imperfect information about the channel at both the transmitter and receiver, performance tends to worsen as the speed of a moving mobile increases. On the other hand, performance of space-time block coding schemes, which are "open-loop" in not relying on feedback from the receiver, tend to improve with increasing mobile speeds, becoming increasingly less sensitive to channel estimation imperfections with increasing speed.

It has been shown that if there were perfect channel feedback the optimal transmission strategy is transmission in a single direction specified by the feedback. This is known as a beamforming strategy. Conversely, it has been shown that with no channel feedback the optimum strategy is to transmit equal power in orthogonal independent directions. This is known as a diversity strategy. However, in practice, feedback information is often neither perfect nor zero.

Imperfect feedback about channels has started to be considered in the known art. In one known approach, a given transmission strategy is classified according to the rank of its input spatial covariance matrix. For instance, a beamforming strategy corresponds to a rank-one matrix while a covariance matrix with full rank indicates a diversity strategy.

SUMMARY OF THE INVENTION

An embodiment of the present invention is a method of transmitting signals from a transmitter comprising two or more antennas in a mobile telecommunications network. The method involves determining channel state information, estimating the reliability of that channel state information, and space time block encoding at least one data sequence. Before transmitting the data sequence, a linear transformation is applied to the data sequence so as to at least partially compensate for channel variations. The linear transformation is dependent upon channel state information and upon the estimated reliability of channel state information.

Other embodiments of the present invention also provide a corresponding transmitter, receiver, and network for mobile telecommunications.

The inventor considered how, in order to improve performance for a wide range of mobile speeds, channel state information could be used in conjunction with space-time codes. In consequence, a linear precoding function is provided that is adapted with respect to both channel state information and channel state information reliability.

Embodiments of the invention can handle both extremes of channel knowledge, i.e. where there is perfect channel knowledge at the transmitter and where there is no channel knowledge at the receiver, and all cases in between these two extremes. Between the two extremes, available channel information is taken into account considering channel state information reliability so as to improve the space-time codes performance. Performance can be improved in both networks involving closed loop feedback and those involving open loop feedback.

An embodiment of the invention is a Universal Mobile Telecommunications System (UMTS) space-time coded system, where knowledge of the reliability of channel state information is used together with the channel state information itself in order to adapt the transmitter to varying channel state information and channel state information reliability conditions. Performance degradation due to limited channel state information reliability is thus combated and robustness achieved.

BRIEF DESCRIPTION OF THE DRAWINGS

Embodiments of the present invention will now be described by way of example and with reference to the drawings, in which.

DETAILED DESCRIPTION

For ease of understanding a more general description is presented followed by an explanation of implementation aspects in a mobile telecommunications network of Universal Mobile Telecommunications System (UMTS) type. It should be noted that the present invention has applications not only in UMTS, but also, by way of example and without limitation, in communication systems such as code division multiple access (CDMA) and wideband code division multiple access (W-CDMA).

MIMO systems, for example for use in UMTS, typically involve space-time block encoding. An example of space-time block encoding scheme for two transmit antennas is presented in S. M. Alamouti, "A Simple Transmit Diversity Technique for Wireless Communications", IEEE Journal on Selected Areas in Communication, Vol. 16, No. 8, pp. 1451–1458, October 1998 and is also described in U.S. Pat. No. 6,185,258. The encoding and transmission sequence for this scheme is as follows: at a first transmission time instant $t_1$ symbols $x_1$ and $x_2$ are transmitted from antennas 1 and 2 respectively and at the next transmission instant $t_2$ symbols—$x_2$* and $x_1$* are transmitted from antennas 1 and 2 respectively, where * denotes complex conjugate. This transmission sequence Z can be represented in matrix form as $$\begin{bmatrix} x_1 & x_2 \\ -x_2^* & x_1^* \end{bmatrix}.$$

As further background, it is known that the performance of MIMO systems can sometimes be improved by preceding. Precoding means applying a linear transformation to symbols. For example, a linear precoder for space time coded systems which takes account if channel state information is described in a paper by S. Zhou and G. B. Giannakis entitled "Optimal transmitter eigen-beamforming and space-time block coding based on channel mean feedback", IEEE Transactions on Signal Processing, Vol. 50, n° 10, October 2002.

Figure 1:
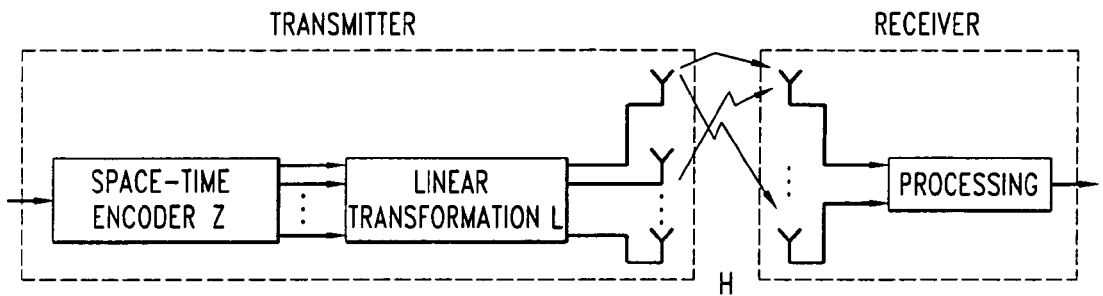
FIG. 1 is a diagram illustrating a MIMO telecommunications system.

A linear precoder that exploits knowledge of channel state information is included in a space-time coded MIMO system so as to enhance performance. Let us consider a multiple-input multiple output (MIMO) telecommunications network consisting of M transmit antennas and N receive antennas, as shown in FIG. 1. The transmitter is, for example, a base station for mobile telecommunications.

For the analysis below, the network is considered to have one receive antenna (i.e. N=1); however, the approach presented can be readily generalised to any number of receive antennas. Without loss of generality, let us consider a channel which is non-selective in frequency. Each entry $h_i$ of the M×1 channel vector h represents the channel state, also known as the channel transfer function or channel response, between transmit antenna i and the receive antenna. Some information on channel state is known at the transmitter and at the receiver.

As depicted in FIG. 1, a space-time encoder maps the input data sequence $x=(x_1, x_2, \ldots x_Q)$ to be transmitted into a Q×M matrix Z of codewords, that are split on a set of M parallel sequences. These codewords are then transformed by a M×M linear transformation denoted L in order to adapt the code to the available channel information. The resulting sequences, which are represented by the columns of a Q×M matrix C=ZL, are sent from the M transmit antennas over Q time intervals. The received signal included in a Q×1 vector y is then a superposition of M transmitted sequences corrupted by an additive white Gaussian noise characterised by the Q×1 vector n and with covariance matrix equal to $\sigma^2 I_Q$:

$$y=Ch+n \quad (1)$$

A block-fading model is assumed, i.e. that the channel remains constant over a number of symbol periods (spanning a space-time codeword) and then changes in a statistically independent fashion for the following codeword period.

At the receiver the symbol-by-symbol detection is performed. The receiver is a maximal ratio combining (MRC) receiver, that is one which maximises the signal to noise ratio for a given precoder matrix C. The problem to be addressed is how to select an optimal precoder matrix C, regardless of whether perfect or imperfect channel state information is available at the transmitter.

Channel state information (CSI) means channel estimates, which may be quantised due to the limited feedback bandwidth. The channel state information is partial in the sense that it may not be completely accurate and hence not be completely reliable.

Based on the (partial) channel state information (CSI) f(h) available at the receiver, the channel h conditional on that information (and so denoted the conditional channel) is now considered. For this analysis, h and f are assumed to follow a Gaussian distribution $N(0, \sigma_h^2 I)$.

Denoting the expected value of the conditional channel as $$E\{h|f\}=\bar{h} \quad (2),$$

the conditional channel can be expressed as a function of the partial CSI function f as:

$$h|f(h)=\bar{h}+\epsilon \quad (3)$$

where $\epsilon$ is the channel estimation error and $\epsilon$ has a variance of $\sigma_\epsilon^2$.

The optimal precoder matrix C is computed based on minimisation of symbol-error-rate (SER). A closed form expression for SER as described in the Zhou and Giannakis paper mentioned above is used, and the bound of SER known as the Chernoff bound will be used for this analysis. Background to the Chernoff bounds is provided in M. K. Simon, M. S. Alouini, "Digital Communication over Generalised Fading Channels: A Unified Approach to the Performance Analysis", John Wiley & Sons, 2000.

In order to compute the bound, the signal to noise ratio at the receiver must first be determined.

According to the above described signal model defined by Equation (1), the signal-to-noise-ratio γ at the MRC receiver can be written as:

$$\gamma=E\{|h^H C^H Chs|^2\}/E\{h^H C^H nn^H Ch\}=h^H C^H Ch\, E_s/\sigma^2 \quad (4)$$

where E is expectation, h is channel vector, S is the transmitted symbol, H denotes the Hermitian of the matrix, $\sigma^2$ is the noise variance, and $E_s$ is the average symbol energy. Symbols are of an m-PSK constellation.

Based on the following eigen-decomposition:

$$C^H C=U_C \Lambda_C U_C^H \quad (5)$$

where U is the matrix of eigenvectors of $C^H C$, $U_C$ is unitary and $\Lambda_C=\mathrm{diag}(\delta_1, \delta_2 \ldots, \delta_M)$ (in other words $\Lambda_C$ is the diagonal matrix of the eigenvalues of $C^H C$ ) with $\delta_i$ the i-th eigenvalue of $C^H C$, the signal-to-noise-ratio γ is a summation of the signal to noise ratios (SNRs) for each sub-channel, (each sub-channel corresponding to a transmit antenna):

$$\gamma = \sum_{i=1}^{M} \gamma_i \quad (6)$$

It was shown in the previously mentioned Zhou and Giannakis paper that the average SNR on each sub-channel is:

$$\bar{\gamma}_i=\delta_i(1+K_i)\sigma_\epsilon^2 E_s/\sigma^2 \quad (7)$$

where $K_i=|[U_C^H \rho f]_i|^2/\sigma_\epsilon^2$, where ρ denotes the correlation coefficient between the actual channel, i.e. channel vector h, and the channel state information (CSI) denoted f. (This is defined in Equation 15 below).

The Chernoff bound on SER has been proved in the previously mentioned Simon and Alouini paper to be:

$$SER_{BOUND} = \alpha \prod_{i=1}^{M} \frac{1}{1+\delta_i \xi} \exp\left(-\frac{K_i \delta_i \xi}{1+\delta_i \xi}\right) \quad (8)$$

where $\alpha = \frac{(m-1)}{m}$, $\xi = g_{m-PSK}\sigma_\epsilon^2 E_s/\sigma^2$, with $g_{m-PSK} = \sin^2\left(\frac{\pi}{m}\right)$.

The optimal precoder is based on minimisation of a pairwise error probability (union bound). Specifically, the optimal precoder matrix C is the solution to the following optimisation problem, in order to minimise the symbol error rate:

$$\min_C SER_{BOUND} \quad (9)$$

$$s.t. \ \text{trace}\{C^H C\} = 1$$

This means minimising with respect to C the $SER_{BOUND}$ subject to the summation of the diagonal elements of $C^H C$ representing transmitted power being constrained as equal to one.

Let now the correlation matrix of the mean conditional channel $$E\{h|f\}E\{h|f\}^H = \bar{h}\bar{h}^H = U_h D_h U_h^H \quad (10)$$

where $U_h$ is the matrix of eigenvectors of the correlation matrix of the mean conditional channel, $D_h = \text{diag}(\|\bar{h}\|^2, 0, \ldots, 0)$ is the matrix of eigenvalues of the correlation matrix of the mean conditional channel, and $\lambda = \|\bar{h}\|^2 \cdot \|\bar{h}\|$ is, of course, the norm of $\bar{h}$.

It was proved in the previously mentioned Zhou and Giannakis paper that the optimal precoder C has $$U_C = U_h \quad (11)$$

Combining the equations (5) and (11), the optimal precoder matrix $$C = ZL = Z\Lambda_C^{1/2} U_h^H \quad (12)$$

(with the unitary matrix Z being the space-time encoder) is a generalised beamformer with multiple beams pointing to orthogonal directions along the eigenvectors of the correlation matrix of the mean conditional channel. The power loading along the eigenvectors is determined by the matrix $\Lambda_C$.

The power constraint in (9), equivalent to the average transmitted symbol power being $E_s$, is used to identify the optimal $\Lambda_C = \text{diag}(\delta_1, \delta_2, \ldots, \delta_M)$:

$$\delta_2 = \ldots = \delta_M = \left[\frac{2a}{b + \sqrt{b^2 - 4ac}} - \frac{1}{\xi}\right]_+ \quad (13)$$

$$\delta_1 = 1 - (M-1)\delta_2 \quad (14)$$

where $a = (1 + M/\xi)^2$, $b = \lambda/(\xi\sigma_\epsilon^2) + (1 + M/\xi)(2M-1)$, $c = M(M-1)$, and $(\cdot)_+$ stands for $\max(\cdot, 0)$ i.e. that the expression in parentheses takes its actual computed value if positive else is set to zero if negative.

Application to a Two Antenna Transmission System

The application of the proposed precoder matrix C to a 2×1 (2 transmit antennas, 1 receive antenna) system with Alamouti space-time block coding is now considered. In this case, as previously mentioned:

$$Z = \begin{bmatrix} x_1 & x_2 \\ -x_2^* & x_1^* \end{bmatrix}.$$

The computation of the precoder C given in equation (12) is based on the assumptions that the noise follows a Gaussian distribution, that is $n \sim N(0, \sigma^2 I)$ of known covariance $\sigma^2$, and the conditional channel $h|f(h) \sim N(\rho f, \sigma_\epsilon^2 I)$, that is the conditional channel follows a Gaussian distribution with mean $\rho f$ and covariance $\sigma_\epsilon^2 I$ where, as previously mentioned f is the partial CSI information available at the receiver, and $\rho$ the correlation coefficient between the actual channel h and the CSI information f. $\rho$ represents the reliability of the channel state information (CSI) and is such that:

$$E\{hf^H\} = \rho\sigma_h^2 I \quad (15)$$

and $$\sigma_\epsilon^2 = \sigma_h^2(1 - |\rho|^2) \quad (16)$$

is the variance of the error. $\sigma_h^2$ is, of course, the variance of channel vector h.

Considering three cases dependent upon the value of $\rho$ as follows:

1) When the CSI reliability $\rho$ is such that $0 < \rho < 1$, the linear transformation L in Equation (12) in the case of a 2 transmit antenna system is written as:

$$L = \begin{bmatrix} \sqrt{\delta_1} & 0 \\ 0 & \sqrt{\delta_2} \end{bmatrix} \begin{bmatrix} w_1^* & w_2^* \\ w_2 & -w_1 \end{bmatrix}$$

where $\delta_1, \delta_2$ are described in Equation (13) and $$U_h = \begin{bmatrix} w_1 & w_2^* \\ w_2 & -w_1^* \end{bmatrix}$$

in Equation (10).

2) When the CSI reliability $\rho = 0$, the Chernoff bound on SER given in Equation (8) becomes:

$$SER_{BOUND} = \alpha \prod_{i=1}^{M} \frac{1}{1 + \delta_i \xi}$$

and the solution to the minimisation problem (9) results in this case in:

$$\delta_1 = \delta_2 = \ldots = \delta_M = \frac{1}{M}.$$

The linear transformation L in the case of a 2 transmit antenna system becomes:

$$L = \frac{1}{\sqrt{2}} \begin{bmatrix} w_1^* & w_2^* \\ w_2 & -w_1 \end{bmatrix}$$

The transmission scheme is equivalent to 2×1 orthogonal space-time coding (Alamouti).

3) When the CSI reliability $\rho \to 1$, then, according to Equation (16), $\sigma_\epsilon^2 \to 0$ and $\xi \to 0$. In this case $$\delta_2 = \ldots = \delta_M = \left[\frac{2a}{b+\sqrt{b^2-4ac}} - \frac{1}{\xi}\right]_+ = 0,$$

as the expression in the brackets takes negative values. Only one eigenvalue is non-zero, $\delta_1 = 1$ and the linear transformation L in the case of a 2 transmit antenna system becomes:

$$L = \begin{bmatrix} w_1^* & w_2^* \\ 0 & 0 \end{bmatrix}$$

The transmission scheme is then equivalent to a beamformer.

Computation of Channel State Information (CSI) Reliability

The evaluation of channel state information (CSI) reliability depends on the nature of the CSI information. Under the assumption that the actual channel coefficients are fed back from the receiver to the transmitter after some delay $D(QT_c)$, i.e. the delay being a function of Q the codeword length and $T_c$ the chip duration, then feedback vector f, i.e. channel state information, is taken to be $$f(h(i)) = h(i-D) \qquad (17)$$

In words, this means that the fedback CSI at time i is considered to be the actual channel at time i−D.

In this case the CSI reliability is the correlation coefficient $\rho$ where $$E\{h(i)h(i-D)^H\} = \rho\sigma_h^2 I \qquad (18)$$

The delay D can be assumed equal to the feedback period, that is a timeslot. The computation of the CSI reliability $\rho$ is based on a running average over consecutive channel feedback samples. This averaging takes into account the previous feedback samples by introducing a forgetting factor $\alpha$. The forgetting factor $\alpha$ aims to weight the contribution of each new channel estimate as compared to the past channel estimates, In mathematical terms, the reliability of CSI follows:

$$\rho(1)=0$$

$$\rho(n)=(1-\alpha)hf^* + \alpha\rho(n-1) \qquad (19)$$

The value of $\alpha$ is selected to be small when the CSI varies fast. This is so that the effect of past samples is smaller then. Conversely, when the CSI is more stable, more account is taken of past samples.

It should be noted that the channel state information (CSI) might be imperfect due to other factors besides feedback delay. For example, it may be a quantised version of the channel or a mean over channel estimates over the timeslot, due to bandwidth limitations, as is the case in Universal Mobile Telecommunications System (UMTS) networks where, according to the relevant standard, a small number of feedback bits is used.

UMTS System Architecture

Consider now application to a Universal Mobile Telecommunications System (UMTS) system with frequency division duplex (FDD) downlink. No assumption is made as to whether the channel is frequency selective or otherwise. In frequency division duplex (FDD) uplink (i.e. from a mobile user terminal to a base station) and downlink (i.e. from a base station to a mobile user terminal) frequencies are different, so channel state information or equivalent information is fed back to the transmitter (base station).

As regards the transmission scheme and channel state information (CSI) reliability, CSI reliability takes into account channel estimates for previous feedback periods (e.g. timeslots) as outlined in Equations (17), (18) and (19). The CSI reliability is also affected by Doppler shift, feedback quantisation, and channel estimation errors.

The computation of the linear transformation matrix L requires the CSI f and the CSI reliability $\rho$ for the previous timeslot. Referring back to FIG. 12, the matrix Z of codewords is known, $\Lambda_C$ is determined from equation 13, and $U^{*H}$ is determined from f and $\rho$ and Equation 10 where $\hat{h}=\rho f$.

In the receiver, the linear transformation matrix L applied in transmission has to be estimated and given to the space time decoder for each tap of its Rake receiver. The receiver is similar to the one used with Space-Time Block Codes (and described in the Alamouti paper referred to above), except the linear transformation matrix L is taken into account. Indeed after despreading, the received signal on each tap p is:

$$Y^p = \begin{bmatrix} y_1^p \\ y_2^p \end{bmatrix} = \frac{1}{\sqrt{2}} \begin{bmatrix} (\sqrt{\delta_1}\, w_1 x_1 + \sqrt{\delta_2}\, w_2^* x_2)h_1^p + (\sqrt{\delta_1}\, w_2 x_1 + \sqrt{\delta_2}\, w_1^* x_2)h_2^p \\ (-\sqrt{\delta_1}\, w_1 x_2^* + \sqrt{\delta_2}\, w_2^* x_1^*)h_1^p - (\sqrt{\delta_1}\, w_2 x_2^* + \sqrt{\delta_2}\, w_1^* x_1^*)h_2^p \end{bmatrix} + \sum^p \qquad (20)$$

where $$\delta_1 + \delta_2 = 1,\ \delta_1, \delta_2 \geq 0,\ \text{i.e.,}\ \delta_1 = \frac{1+\beta}{2},\ \delta_2 = \frac{1-\beta}{2},$$

and $\Sigma^p$ is the noise matrix on tap p and subscript on signals y refers to received symbols at two time intervals. To recover transmit signals $x_1$ and $x_2$, the following operations are applied to the received signal $Y^P$:

$$\begin{bmatrix} \hat{x}_1^p \\ \hat{x}_2^p \end{bmatrix} = \begin{bmatrix} (H_1^p)^* y_1^p + H_2^p (y_2^p)^* \\ (H_2^p)^* y_1^p - H_1^p (y_2^p)^* \end{bmatrix} \qquad (21)$$

where $$\begin{bmatrix} H_1^p \\ H_2^p \end{bmatrix} = \frac{1}{\sqrt{2}} \begin{bmatrix} \sqrt{\delta_1}\,(w_1 h_1^p + w_2 h_2^p) \\ \sqrt{\delta_2}\,(w_2^* h_1^p + w_1^* h_2^p) \end{bmatrix} \qquad (22)$$

are the composite channels on tap p. The combiner block then combines the detected symbols on each tap.

UMTS System Implementation

Figure 2:
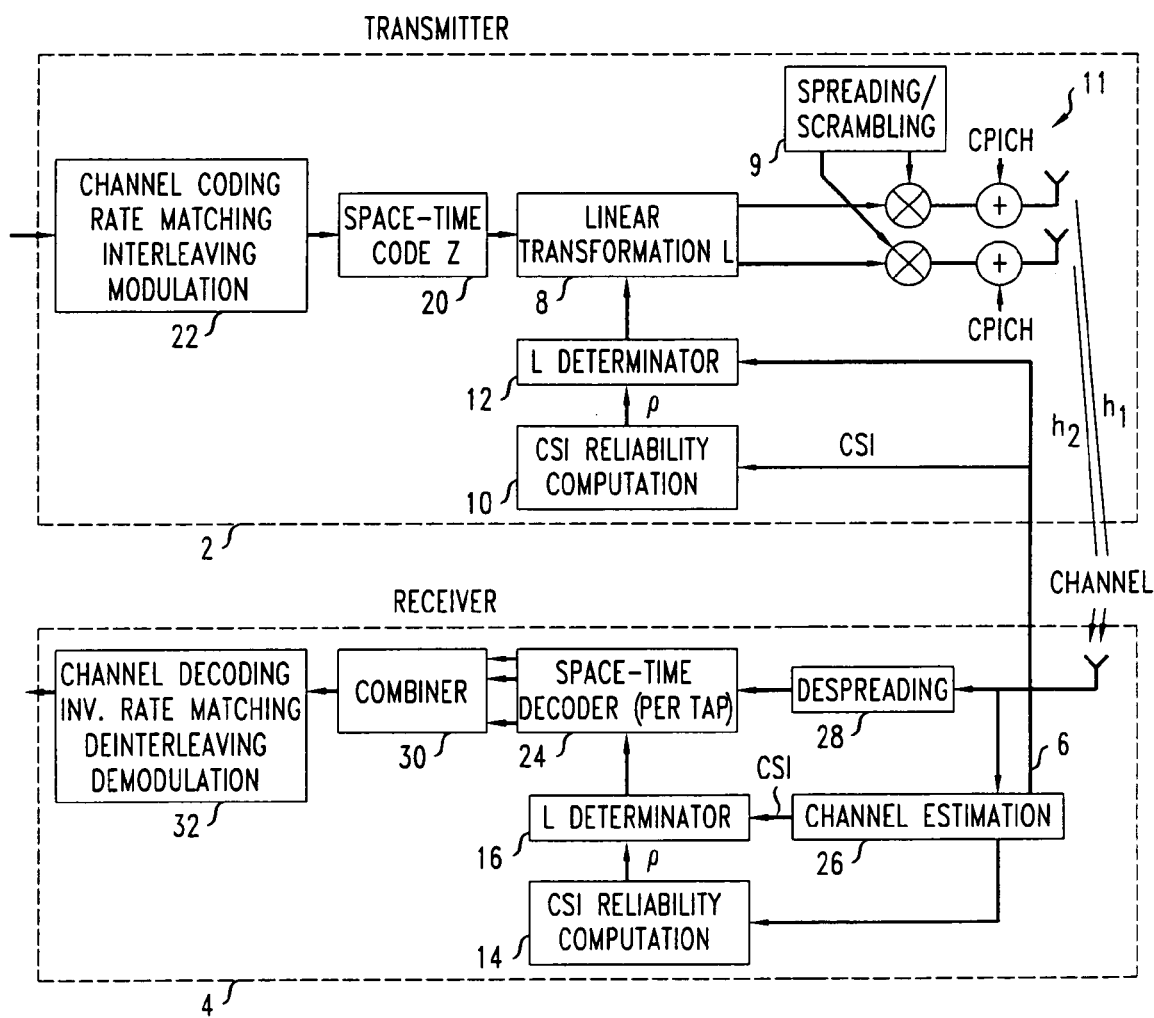
FIG. 2 is a diagram illustrating a transmitter and receiver implementation in UMTS.

A UMTS transmitter 2 and receiver 4 are shown in FIG. 2. The UMTS frequency division duplex (FDD) downlink transmission-reception scheme includes CSI (f) and CSI reliability ($\rho$) dependent linear precoding as explained above. The transmitter 2 thus has some knowledge (f, ρ) about the channel, which has been fedback. In a UMTS network operating FDD downlink (i.e. from base station to mobile station), the CSI is obtained as feedback channel estimates 6 provided as bits sent by receiver 4 (i.e. the mobile station). The relevant modules are, at the transmitter, a linear precoder (L) 8, a processor 10 which receives the CSI and determines the CSI reliability, and L determinator 12. The relevant modules at the receiver are a processor 14 which determines the CSI reliability, an L determinator 16, and a space-time decoder 18.

At the transmitter 2, the linear precoder (L) 8 is applied to the space-time encoded symbols provided from a space-time block encoder 20 after channel coding, rate matching interleaving, and modulation (shown as functional clock 22) in known fashion. The linear precoder L coefficients are computed based on the CSI and CSI reliability in the L determinator 12. The computation of CSI reliability (ρ) in the processor 10 is based on CSI i.e. channel estimates 6 fed back from the receiver 4. It is performed by averaging over time-sequential channel estimates (running average) using a forgetting factor. The forgetting factor aims to weight the contribution of present CSI as compared to the past CSI. This information is fed back to the transmitter using a low-rate feedback link, as available in UMTS. In a UMTS uplink channel there is a number of bits available for communicating information to the transmitter about the received signal. The outputs of the linear precoder 8 are spread/scrambled 9 and subject to addition of Common Pilot Channel (CPICH) coding 11 bits before transmission.

At the receiver 4, received signals are used to provide CSI i.e. estimates (f) in a channel estimation block 26 so as to be used to compute the CSI reliability (ρ) in processor 14 (as at the transmitter). The signals are also despread 28 and applied to a space-time block decoder 24. At the receiver 4 the space-time block decoder (STD,24) has essentially the same structure as a conventional one (described in the Alamouti paper and patent referred to above), but needs to consider instead of the channel estimates, the equivalent channel, defined as the linear transformation of the channel according to the coefficients of L, that is $H_{eq}=[h_{eq,1}\ h_{eq,2}]=HL$. As shown in FIG. 2, the linear precoder L coefficients are estimated in the receiver by an L determinator 16. This has inputs from the channel estimation block 26 and the processor 14 which determines CSI reliability. The outputs of the space-time decoder 24 are provided to a combiner 30 and then channel decoded, inverse rate matched, deinterleaved and demodulated in known fashion (shown in FIG. 2 as functional block 32).

Alternative UMTS Implementation

An alternative implementation is now described, in which instead of the linear transformation matrix L being determined at the transmitter from CSI i.e. channel estimates provided by the receiver, the coefficients of linear transformation matrix L are provided by the receiver.

Figure 3:
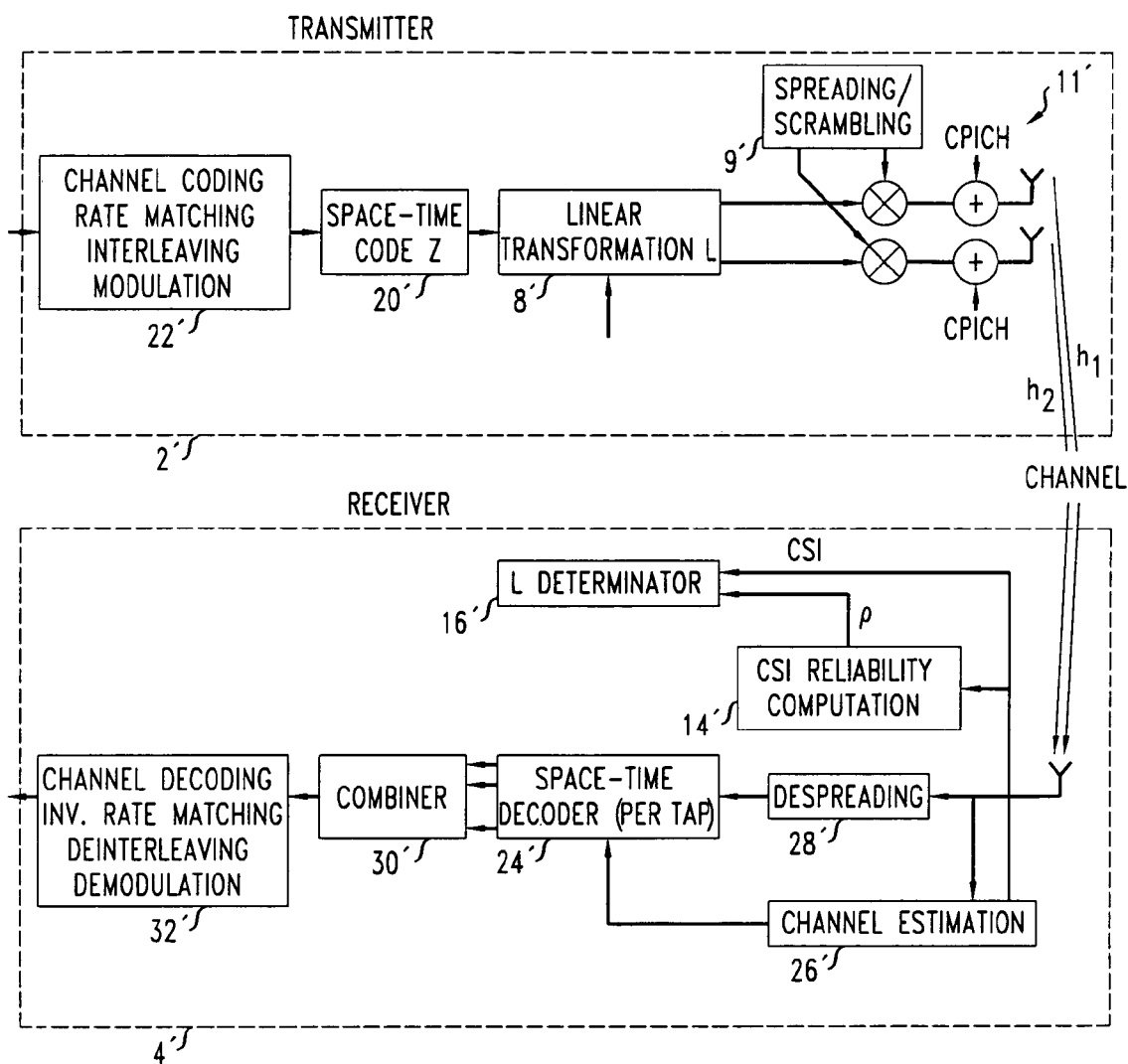
FIG. 3 is a diagram illustrating an alternative transmitter and receiver implementation in UMTS.

In this alternative embodiment, which is shown in FIG. 3, the transmitter 2' is given the coefficients of the precoder L by the receiver 4'. In this UMTS transmitter 2' and receiver 4' operating with frequency division duplex (FDD) downlink, these coefficients are feedback bits sent by the mobile station. The proposed UMTS network is depicted in FIG. 3, where the UMTS FDD downlink transmission-reception scheme includes CSI and CSI reliability dependent linear precoding as explained previously. The relevant module at the transmitter is a linear precoder (L) 8'. The relevant modules at the receiver are a processor 14' which determines the CSI reliability, an L determinator 16', and a space-time decoder 24'.

At the transmitter, the linear precoder (L) is applied to the space-time encoded symbols provided from the space-time block encoder 20' after channel coding, rate matching, interleaving, and modulation (shown as functional block 22') in known fashion. The outputs from the linear precoder 8' are spread/scrambled 9' and subject to the addition of Common Pilot Channel (CPICH) 11' bits before transmission. The linear precoder L coefficients are provided by the receiver 4' as explained below and fed back over air to the transmitter.

At the receiver, the computation of CSI reliability (in a functional block denoted 14') is based on CSI i.e. channel estimates provided from the channel estimator block 26'. It is performed by averaging over time sequential channel estimates (running average) using a forgetting factor. The forgetting factor aims to weight the contribution of the present CSI as compared to the past CSI; the aim being to take account of slowly-varying CSI reliability. The linear precoder (L) coefficients are computed based on CSI and CSI reliability in the L determinator 16'.

At the receiver 4', received signals are used to provide channel estimates in a channel estimation block 26', and after despreading 28' are applied to a space-time decoder 24'. At the receiver, the space-time block decoder (STD) 24' has essentially t he same structure as the conventional one (described in the Alamouti paper and patent referred to above), but needs to consider instead of the channel estimates, the equivalent channel, defined as the linear transformation of the channel according to the coefficients of L, that is $H_{eq}=[h_{eq,1}\ h_{eq,2}]=HL$. The outputs of the space-time decoder are provided to a combiner 30' and then channel decoded, inverse rate matched, deinterleaved and demodulated in known fashion (shown in FIG. 3 as functional block 32').

The invention claimed is:

1. A method of transmitting signals from a transmitter comprising two or more transmit antennas in a mobile telecommunications network, the method comprising determining channel state information, estimating reliability of the channel state information, space time block encoding at least one data sequence, before transmitting the data sequence, applying to the data sequence a linear transformation so as to at least partially compensate for channel variations, the linear transformation being dependent upon the channel state information and dependent upon the estimated reliability of the channel state information, in which where the channel state information is channel estimates in the form of channel coefficients, and the channel state information for a time interval (n) is assumed accurate for the previous time interval (n−1), the channel state information reliability (ρ) is determined as $\rho(1)=0$ $\rho(n)=(1-\alpha)hf^{*}+\alpha\rho(n-1)$ where h is the channel vector, f is the latest channel state information, and α is a forgetting factor.

2. A method according to claim 1, in which the channel state information is channel estimates.

3. A method according to claim 1, in which the reliability of the channel state information is determined from latest channel state information and previous channel state information.

4. A method according to claim 3, in which the latest channel state information is given a weight relative to the previous channel state information, the weight being dependent upon channel state information stability.

5. A method according to claim 1 in which α is selected dependent on the size of the variation between the latest channel state information and the last previous channel state information.

6. A method according to claim 1, in which the linear transformation is applied before block encoding the data sequence.

7. A method according to claim 1, in which the linear transformation is applied after block encoding the data sequence.

8. A method according to claim 1, in which the space-time block encoding is such that at a first transmission time instant first symbol is transmitted from a first of the two antennas and a second symbol is transmitted from the second of the two antennas, then at the next transmission instant a negative complex conjugate of the second symbol is transmitted from the first antenna and a complex conjugate of the second symbol is transmitted from the first antenna.

9. A method according to claim 8, which the space-time block encoding is Alamouti space-time block encoding.

10. A method according to claim 1, in which the transmitter is a base station operating according to a code division multiple access (CDMA) or wideband code division multiple access (W-CDMA) transmission scheme.

11. A method according to claim 10, in which the base station operates in accordance with the Universal Mobile Telecommunications System (UMTS) standard.

12. A transmitter for mobile telecommunications comprising at least two transmit antennas, a space tune block encoder, a linear transformation apparatus operative to transform a data sequence from or to a space time block encoder so as to at least partially compensate for channel variations, a processor operative to receive channel state information and to estimate reliability of the channel state information, and a processor operative to determine the linear transformation to be applied dependent upon the channel state information and the estimated reliability of the channel state information, in which where the channel state information is channel estimates in the form of channel coefficients, and the channel state information for a time interval (n) is assumed accurate for the previous time interval (n−1), the channel state information reliability (ρ) is determined as

ρ(1)=0

ρ(n)=(1−α)hf*+αρ(n−1)

where h is the channel vector, f is the latest channel state information, and α is a forgetting factor.

13. A transmitter according to claim 12, in which the channel state information is channel estimates.

14. A transmitter according to claim 12, in which the reliability of the channel state information is determined from latest channel state information and previous channel state information.

15. A transmitter according to claim 14, in which the latest channel state information is given a weight relative to the previous channel state information, the weight being dependent upon channel state information stability.

16. A transmitter according to claim 14, in which the linear transformation apparatus transforms the data sequence after it is applied to the block encoder.

17. A transmitter according to claim 12, in which α is selected dependent on the size of the variation between the latest channel state information and the last previous channel state information.

18. A transmitter according to claim 12, in which the linear transformation apparatus transforms the data sequence before it is applied to the block encoder.

19. A transmitter according to claim 12, which the space-time block encoder operates such that at a first transmission time instant a first symbol is transmitted from a first of the two antennas and a second symbol is transmitted from the second of the two antennas, then at the next transmission instant a negative complex conjugate of the second symbol is transmitted from the first antenna and a complex conjugate of the first symbol is transmitted from the second antenna.

20. A transmitter according to claim 19, in which the space-time block encoder is Alamouti space-time block encoder.

21. A transmitter according to claim 12, which is a base station operating according to a code division multiple access (CDMA) or wideband code division multiple access (W-CDMA) transmission scheme.

22. A transmitter according to claim 21, which operates in accordance with the Universal Mobile Telecommunications System (UMTS) standard.

23. A network for mobile telecommunications comprising a transmitter and a receiver, the transmitter comprising a space-time block encoder and a linear transformation apparatus operative to transform a data sequence from or to the space-time block encoder by applying a linear transformation so as to at least partially compensate for channel variations, the transmitter comprising at least two transmit antennas, the receiver comprising a space-time block decoder and a channel estimator, a processor operative to estimate channel state information reliability from channel state information provided by the channel estimator, and a processor operative to determine the coefficients of a further linear transformation matrix dependent upon the channel state information and the estimated reliability of the channel state information to be applied to a further data sequence for transmission, the coefficients of the further linear transformation matrix being sent from the receiver to the transmitter for use.

* * * * *